Sept. 29, 1964  B. BUCHNER ET AL  3,150,651
ARRANGEMENT FOR HEATING THE LUBRICATING OIL
OF INTERNAL COMBUSTION ENGINES
Filed Feb. 9, 1961  2 Sheets-Sheet 1
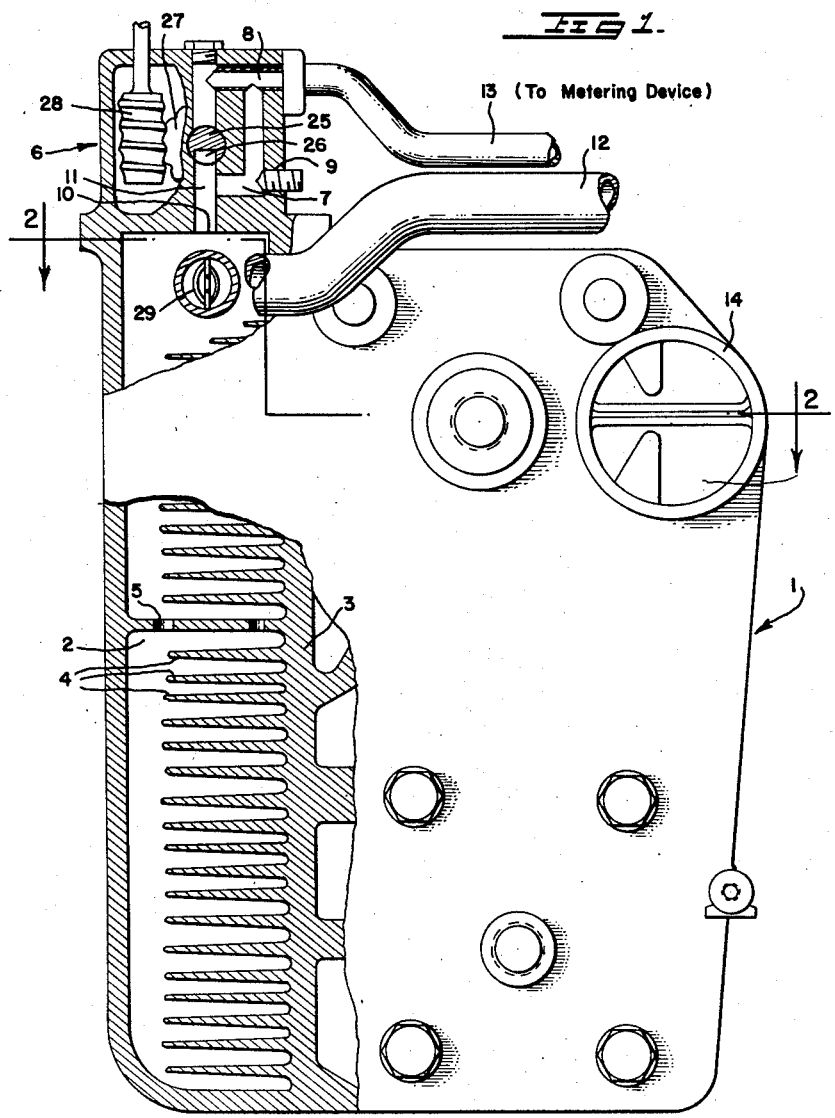
INVENTORS
Bernhard Buchner
Ernst Alt
BY  *Louis A Scholz*
ATTORNEY

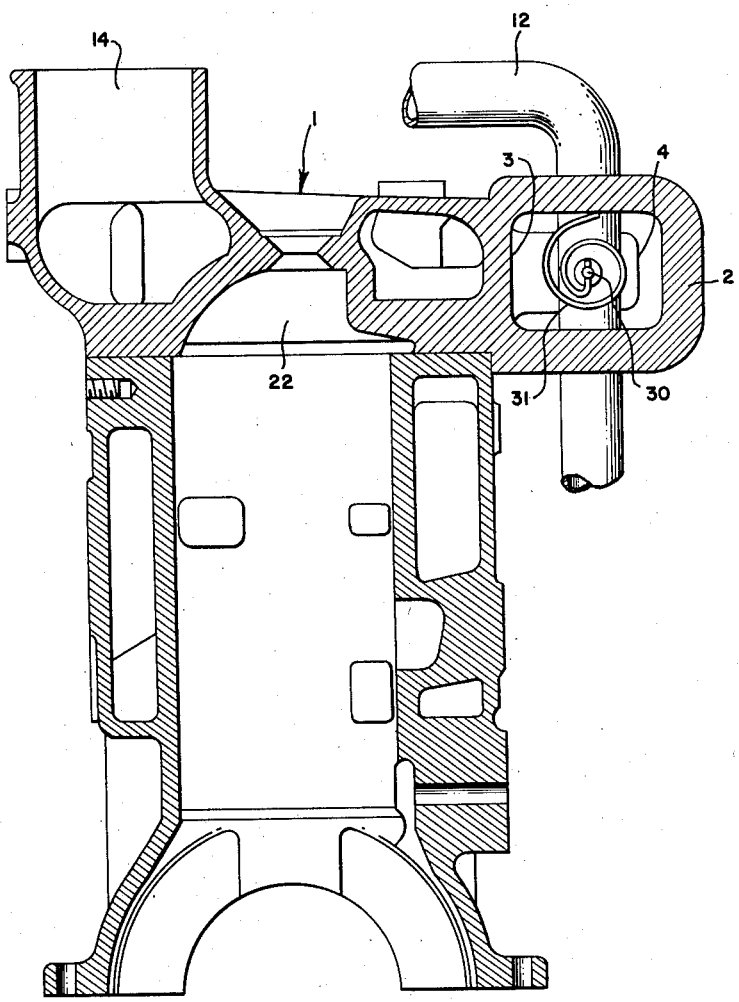

:::
United States Patent Office 3,150,651
Patented Sept. 29, 1964

3,150,651
ARRANGEMENT FOR HEATING THE LUBRICATING OIL OF INTERNAL COMBUSTION ENGINES
Bernhard Buchner and Ernst Alt, Ingolstadt, Germany, assignors to Auto Union GmbH, Ingolstadt (Danube), Germany
Filed Feb. 9, 1961, Ser. No. 100,774
5 Claims. (Cl. 123—122)

The present invention relates to a two-cycle internal combustion engine in which the mixture ratio of oil to gasoline is automatically proportioned in response to the varying load conditions of the engine, and more particularly to an improved arrangement for maintaining the proper mixture ratio of oil to gasoline during cold and very cold weather conditions due to the transfer of heat from the engine to the oil which is fed to the oil metering device for the carburetor.

It is therefore an object of this invention to provide an arrangement in which the tank for the lubricating oil is mounted in heat exchange relationship with the engine so as to maintain the lubricating oil which is fed to the oil metering device at the proper temperature during cold and very cold weather conditions.

It is a further object of this invention to mount the oil tank in heat exchange relationship with the cylinder head or cylinder block of the engine to transfer the heat from these engine parts to the lubricating oil pumped to the metering device so as to reduce the viscosity of this oil and provide a satisfactory ratio of oil to gasoline during cold and very cold weather conditions.

The present invention is generally concerned with an arrangement in which the tank for the lubricating oil is mounted in heat exchange relationship with the cylinder head or cylinder block of the engine. This arrangement of the oil tank provides that the temperature of the lubricating oil within this tank is adjusted continuously to the operating temperature of the engine. The lubricating oil is thereby maintained at a reasonably constant viscosity under normal driving conditions even in cold weather, so that the proper amount of lubricating oil is dispensed by the metering device into the carburetor, which contributes to a trouble free operation of the engine. In order to provide the proper viscosity of the lubricating oil during cold and very cold weather conditions, it is important to keep the oil connection line from the oil tank to the oil pump as short as possible. A most favorable arrangement consists in securing the oil pump directly to the oil tank.

In order to provide a very rapid heat transfer from the engine cooling means i.e. water coolant, in the cylinder head or block of the engine to the lubricating oil in the tank, heat exchange ribs or fins extend from the adjacent cylinder head or cylinder block walls into the interior of the oil tank. In the event that the oil tank is mounted on the side of the cylinder head or cylinder block, heat transfer ribs are also provided which preferably separate the pump portion from the upper portion of the oil tank.

As mentioned above, it is desirable to make the feed back line from the oil pump to the oil tank as short as possible in order to obtain a uniform lubrication of the engine at different temperatures. If a short feed back line is provided the feeding pressure of the lubricating oil is maintained substantially uniform under varying temperature conditions. The oil feeding pressure and consequently the amount of oil fed back through the line may also be maintained substantially uniform by insulating the feed back line so as to make it less subject to temperature changes.

In order to control the amount of oil returned through the feed back line to the oil tank, it may be desirable to provide a flow control device in this line. For this purpose a needle valve having a conical control portion may be employed. The needle valve is adapted to extend transversely into the pipe of the feed back line to vary the cross sectional area of the pipe at this point and thereby control the amount of oil which is permitted to pass through this line.

The invention is illustrated in the accompanying drawing in which FIGURE 1 shows diagrammatically an embodiment of the invention in a plan view, partially in section, and FIG. 2 is a sectional view taken on the line 2—2 of FIG. 1.

Referring now to the drawing, numeral 1 designates a cylinder head and numeral 2 designates the lubricating oil tank which is connected in heat transfer relationship with the cylinder head by means of an integral wall 3. An oil pump 6 is mounted to the side of the oil tank 2. The interior of the cylinder head 1 is connected with the interior of the oil tank 2 by means of rib or fin members 4 secured to connecting wall 3. In order to provide optimum heat exchange, the rib or fin members are preferably integral with connecting wall 3. The interior of the oil tank 2 and the oil sump are divided by means of one or more rib members 5. In this manner the oil tank is separated into two chambers so that the oil is allowed to flow only through apertures of appropriate size from one chamber into the other chamber when the engine is placed in a tilted position. A short feed back line 7 is arranged between the oil pump 6 and the oil tank 2. If space conditions permit, it may be desirable to arrange the feed back line and the oil supply line which connects the oil pump to the metering device of the carburetor in the cylinder head or cylinder block proper. When this arrangement is feasible it is not necessary to provide the feed back conduit or the supply conduit to the metering device with an insulating covering, as these conduits are maintained at the operating temperature of the engine by the heat of the coolant. If conduit 7 which connects the oil canal 8 to the oil tank 2 cannot be arranged in the housing of the oil pump 6, this conduit may be insulated in such a manner that the lubricating oil which is returned through it to the oil tank is not subject to cooling. If the temperature of the lubricating oil decreases as it passes through the feed back line, the lubricating oil contained therein becomes more viscous and is likely to affect the metering device adversely in causing it to dispense a reduced amount of lubricating oil into the carburetor and engine. A bore 9 is provided in feed back conduit 7 in which a needle valve is arranged. The conical portion of the needle valve extends into the feed back line 7 and may be adjusted to control the flow of the lubricating oil through this line. In this manner bore 9 and its valve member serve also as a control for the oil supply pressure. Instead of a needle valve any other suitable valve member may be used. For example, a suitable control screw may be threaded into the housing adjacent the needle valve so as to extend into bore 9 and may be adjusted to control the flow of lubricating oil through feed back line 7.

According to the invention a heat pipe 12 may be arranged so as to pass through the oil tank 2 at the side of the inlet opening 10 of an oil supply canal 11 which connects the oil tank to the pump. The heat pipe 12 is suitably charged with hot exhaust gases, and a thermostat or other appropriate heat responsive means may be provided which closes the heat pipe when the lubricating oil has reached the predetermined operating temperature. This arrangement has the advantage that the lubricating oil is preheated to the operating temperature immediately upon starting the engine, by means of the hot exhaust gases derived from the initial combustion.

The cylinder head is shown in FIGURE 2 with the explosion chamber 22 and thermostatic valve drive shaft 30 and thermostatic element 31, and in FIGURE 1 the pump rotor 25 with its impeller pocket 26 is shown driven by gear 27, which in turn is driven by worm 28 pump drive means.

According to the invention the section of the heat pipe 12 which carries the exhaust gases to the portion which passes through the oil tank is preferably disposed adjacent a pipe 13 and substantially parallel thereto. Pipe 13 supplies lubricating oil from the oil pump to the metering device (not shown) and the proximity of heat pipe 12 maintains the oil in pipe 13 at the proper temperature as it flows toward the metering device. This is particularly desirable in a construction in which the metering device must be mounted separately and spaced from the oil pump due to the existing space conditions so that a connecting line must be provided. The heat radiation from pipe 12 which is being traversed by the hot exhaust gases prevents the lubricating oil in pipe 13 from cooling down on its way to the metering device and assures that the oil supply dispensed by the metering device into the carburetor is not adversely affected due to an increased viscosity of the lubricating oil.

The mounting of the oil tank 2 is generally governed by the space conditions existing on the engine. In some cases it might be desirable to arrange the oil tank 2 in the proximity of the water coolant connecting tube 14, and in the case of thermo-syphon cooling, the coolant connecting tube would transfer the heat particularly rapidly and intensely to the oil in tank 2 through wall 3 and fins 4. It may also be possible to mount a compact oil tank in the proximity of the coolant connecting tube, in which case the oil tank would not need to be divided into separate chambers such as by rib members 5.

The foregoing is considered as illustrative only of the principles of the invention. It is not desired to limit the invention to the exact construction and operation shown and described since numerous modifications and changes will readily occur to those skilled in the art and accordingly all suitable modifications and equivalents may be applied which fall within the scope of the invention as claimed.

What is claimed is:
1. Arrangement for heating the lubrication oil of an internal combustion engine comprising in combination a cylinder head having a double wall portion at least adjacent one side, a transverse wall inside said double wall portion defining a lubricating oil compartment along said one side, a carburetor, an oil metering device for dispensing oil into the carburetor intake, an oil pump, first conduit means for connecting said oil pump to said oil metering device, a housing for said oil pump mounted in heat exchange relationship with said oil compartment, an oil canal in said pump housing having an inlet and communicating with said oil compartment, second conduit means for connecting said oil metering device to said oil compartment for returning any quantity of lubricating oil pumped in excess of that metered to regulate the heat transfer to said oil compartment, and third conduit means heated by the exhaust gases from the engine and conducted through said oil compartment for heating the oil in said compartment, wherein said third conduit means is located directly adjacent said oil canal inlet.

2. Arrangement according to claim 1 wherein the oil compartment extends along the entire length of said cylinder head.

3. Arrangement according to claim 2 wherein said oil compartment is divided into separate chambers by at least one intermediate transverse wall having at least one opening providing communication between said separate chambers.

4. Arrangement according to claim 1 wherein said transverse wall has integral fins extending into said oil compartment.

5. Arrangement according to claim 1 wherein said wall is an integral cast wall portion of said cylinder head.

References Cited in the file of this patent

UNITED STATES PATENTS

| 1,296,124 | Schettler | Mar. 4, 1919 |
| 1,747,772 | Haze | Feb. 18, 1930 |

FOREIGN PATENTS

| 234,854 | Great Britain | Dec. 3, 1925 |
| 278,375 | Switzerland | Jan. 3, 1952 |
| 455,391 | Great Britain | Oct. 20, 1936 |